UNITED STATES PATENT OFFICE.

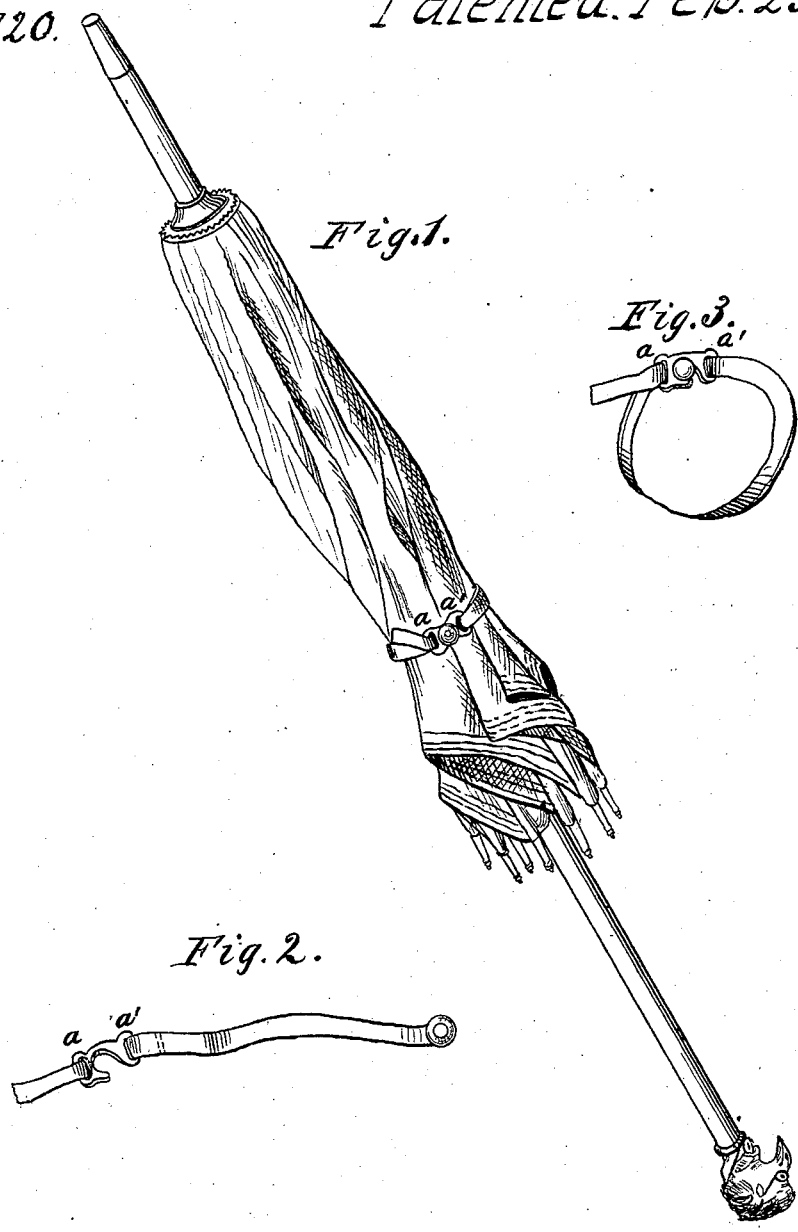

WILLIAM H. RICHARDSON, OF PHILADELPHIA, PENNSYLVANIA.

IMPROVEMENT IN HOOKS FOR FASTENING UMBRELLAS.

Specification forming part of Letters Patent No. 41,720, dated February 23, 1864.

*To all whom it may concern:*

Be it known that I, WILLIAM H. RICHARDSON, of Philadelphia, Pennsylvania, have invented a certain new and useful Improvement in Umbrella-Fastenings, of which the following is a full, clear, and exact description, reference being had to the accompanying drawings, which make part of this specification, and in which—

Figure 1 represents a view of my invention applied to a parasol. Fig. 2 represents a view of the fastening detached, and Fig. 3 represents a view of the fastening detached from the umbrella, but hooked on the button.

The modes of fastening now in common use to close umbrellas and parasols neatly around the frame when folded are all inconveniently complex or objectionable, and particularly so when they are to be closed or opened with a gloved hand.

It is the object of my invention to produce a simple but effective fastening that shall obviate all such objections; and my improvement consists in an open metallic hook to pass around the shank of the button, and be nearly centrally situated between loops capable of receiving and being fastened to an elastic strap at one end and a tag to draw the hook at the other. My improved fastening is designed to be used with an ornamental or plane button sewed onto the cover of an umbrella or parasol and with an elastic strap. It consists in a hook of the form substantially as shown in Fig. 2 of the drawings. This hook, it will be seen, is open on one side to admit the shank of a button, as shown in Figs. 1 and 3 of the drawings. The recess of the hook must be deep enough to receive the shank fully within it, and the end of the hook should pass far enough beyond the shank of the button to hold it in place. It had likewise better be rounded at the point to prevent it from catching in such parts of the garments as it is at times liable to come in contact with. This form will, moreover, prevent the hook from injuring the goods to which it may be attached.

On the ends of the hook I form loops $a$ $a'$, by one of which the hook is attached to one of the ends of the elastic strap sewed on the cover of the umbrella under the button, the strap being long enough to pass around the umbrella or parasol. To the loop of the other end of the hook a short piece of elastic cord, braid, or of rubber, or an ornamental tassel may be attached to draw the hook from around the shank of the button.

My hooks may be made by using dies of proper form for cutting, or punches for punching them from sheets of suitable thin metal, or they may be made otherwise, and may be embossed or gilded or ornamented in any desired mode.

I do not desire to limit my fastening solely to the covers of umbrellas or parasols, for obviously it may be applied advantageously to gloves, braces, garters, shoes, gaiters, and other articles of wearing-apparel.

What I claim as my invention, and desire to secure by Letters Patent, is—

The hook-fastening for umbrellas and other articles of wearing-apparel, constructed and operating substantially as and for the purposes described.

In testimony whereof I have hereunto subscribed my name.

WM. H. RICHARDSON.

Witnesses:
 B. ROBERSON,
 EDM. F. BROWN.